United States Patent [19]
Thibault

[11] Patent Number: 5,599,228
[45] Date of Patent: Feb. 4, 1997

[54] CLAMP FOR HOLDING OYSTERS AND LIKE MOLLUSC WHILE BEING PRYED OPENED

[76] Inventor: Laurent Thibault, 1400 Ch., Filteau, Berniéres, QC, Canada, G7A 2E7

[21] Appl. No.: 634,938

[22] Filed: Apr. 19, 1996

[51] Int. Cl.⁶ .................................................. A22C 29/04
[52] U.S. Cl. ............................ 452/185; 452/13; 269/287
[58] Field of Search ............................... 452/194, 185, 452/13, 16, 17, 12; 269/287

[56]         References Cited

U.S. PATENT DOCUMENTS

| 299,756 | 6/1884 | Drake | 452/185 |
|---|---|---|---|
| 2,136,816 | 11/1938 | Frazier | 452/16 |
| 2,609,565 | 9/1952 | Mostowicz | 452/16 |
| 2,612,653 | 10/1952 | Labat | 452/194 |
| 3,181,198 | 5/1965 | Stelzen | 452/185 |
| 4,133,078 | 1/1979 | Cromwell | 452/17 |

FOREIGN PATENT DOCUMENTS

| 466117 | 5/1914 | France | 452/194 |
|---|---|---|---|

*Primary Examiner*—Willis Little

[57]             ABSTRACT

A clamp for safely opening oysters and the other molluscs. It works as a pincer to trap an oyster to be pryed open. The clamp consists of two half-shells, hinged together at their rear ends to a closed position forming an oyster receiving enclosure opened at the front to expose the oyster. The bottom half shell is larger than the top half shell so as to receive the latter and thus vary the size of the enclosure to trap oysters of different sizes. The front edge position of the two half shells form outward ribs serving as a hand shield for the users hand, which presses onto the half shells to trap an oyster and hold it firmly while the other hand uses an oyster knife to pry it open.

13 Claims, 3 Drawing Sheets

CLAMP FOR HOLDING OYSTERS AND LIKE MOLLUSC WHILE BEING PRYED OPENED

BACKGROUND—FIELD OF INVENTION

This invention relates to a hand held clamp used when prying open oysters and other molluscs.

BACKGROUND—DESCRIPTION OF THE PRIOR ART

A number of oyster opening devices are known and generally comprise a pinching cavity to hold an oyster and a lever to pry open the latter. A number of those devices have been drawn to our attention:

CAN 1,034,722, Finkelman, 18 Jul. 1978 which shows an oyster opener comprising a double L-shaped board on a table. It has two grooves on one side of an L and a cavity in its centre to place the oyster to be opened. The oyster is held in place by a cover which traps the oyster and a guard prevents injuries. This device is bulky and cannot be stored easily in a drawer in the kitchen, or be used by clients at the table of a restaurant.

CAN 1,125,961, Desaulniers, 22 Jun. 1982 illustrates another oyster opening device consisting in a board having a curved wall to restrain an oyster and pivot arm fixed at one end of the board. The oyster is placed against the wall and the arm is swung until it touches the oyster and pressure forces the oyster open. This device is bulky and has to be fixed in a permanent place; it is not convenient in a normal kitchen. Also, it is hard to get the opening point of an oyster as the position is different for every oyster: the oyster tends to move and nothing is planned to cut the oyster's muscle.

OBJECTS AND ADVANTAGES

The main objective of this invention is to provide a clamp to be used when prying open oysters that is light and easy to use, thus permitting its use in both restaurants and homes. It can also be used directly at the table and can easily be put away in a drawer. It is also washable in a dishwasher, while a wooden board cannot.

Another object is to provide a clamp of the character described capable of holding molluscs of various sizes and shapes and shielding the user's hand.

Another object is to provide a hinge connecting the two half shells of the clamp which enables it to ease the assembly and dismantling of the device.

SUMMARY OF THE INVENTION

A clamp for holding an oyster and like mollusc while being pryed opened, comprising an inner half shell and an outer half shell, each half shell of elongated shape, with a front edge and a rear end and of U-shaped cross-section including two side walls, a central wall and a back wall which define a cavity opened at the front edge, hinge means hinging the two-half shells together at their rear end, the two half shells capable of pivoting to a closed position facing each other with the two cavities forming an enclosure with a front opening, the side walls of the inner half shell nesting within the cavity the outer half shell, whereby the size of the enclosure is variable and the enclosure is accessible at the front opening, whereby a mollusc of variable size can be located in the enclosure and clamped by inward pressure exerted on the central walls while being exposed to a prying knife at the front opening.

BRIEF DESCRIPTION OF THE DRAWINGS

The present invention will be further understood from the following description with reference to the drawings in which.

In the drawings the same characterizing elements are identified by the same numbers.

DESCRIPTION OF THE PREFERRED EMBODIMENT

Figure 1:
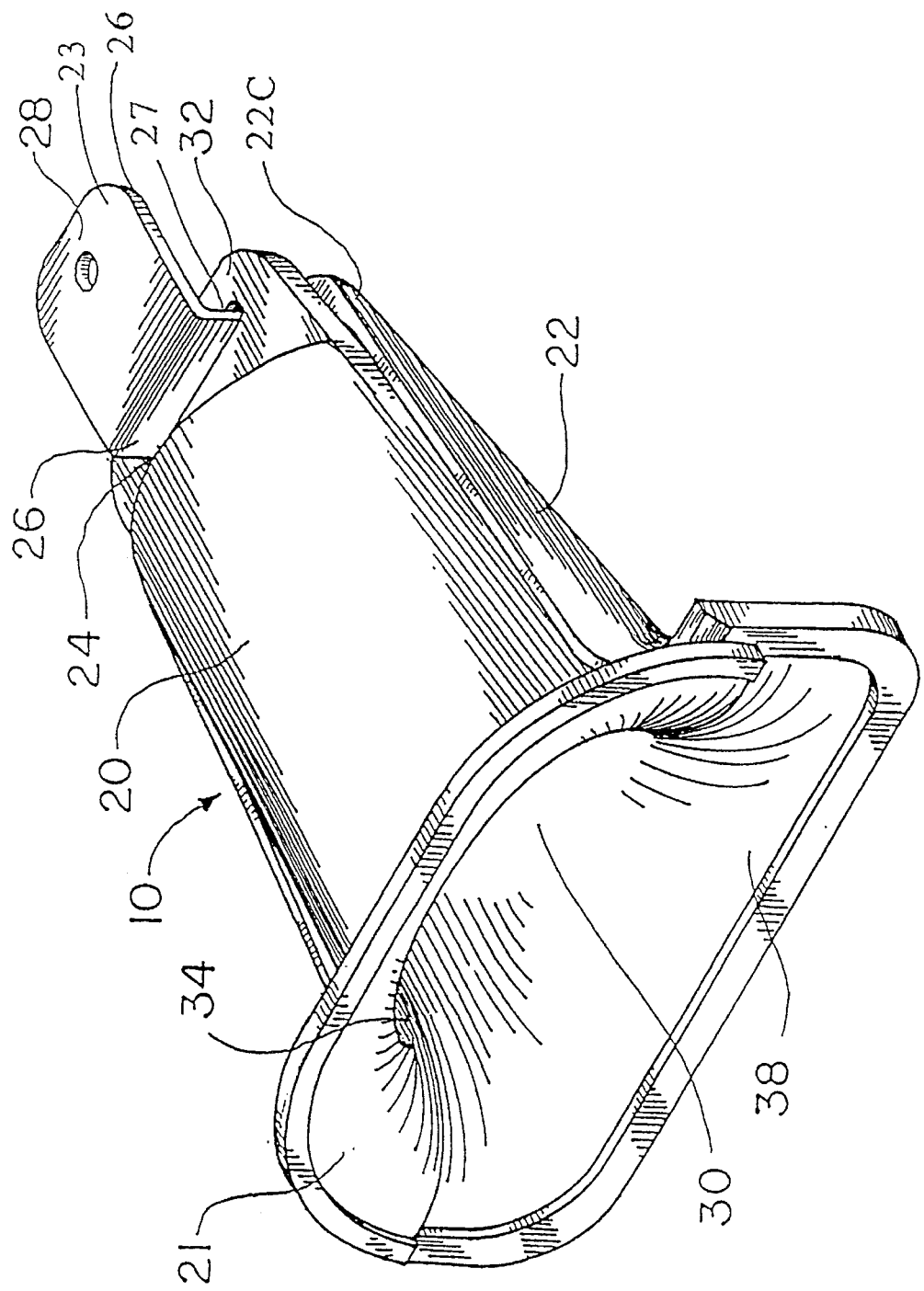
FIG. 1 is a perspective view of the oyster clamp

FIG. 1 shows an oyster clamp 10 comprising an inner shell 20 and an outer shell 22. Both half shells 20, 22 are elongated and of U shaped cross-section defining a pair of side walls 20a, 22a joined by a central wall 20b, 22b.

Figure 5:
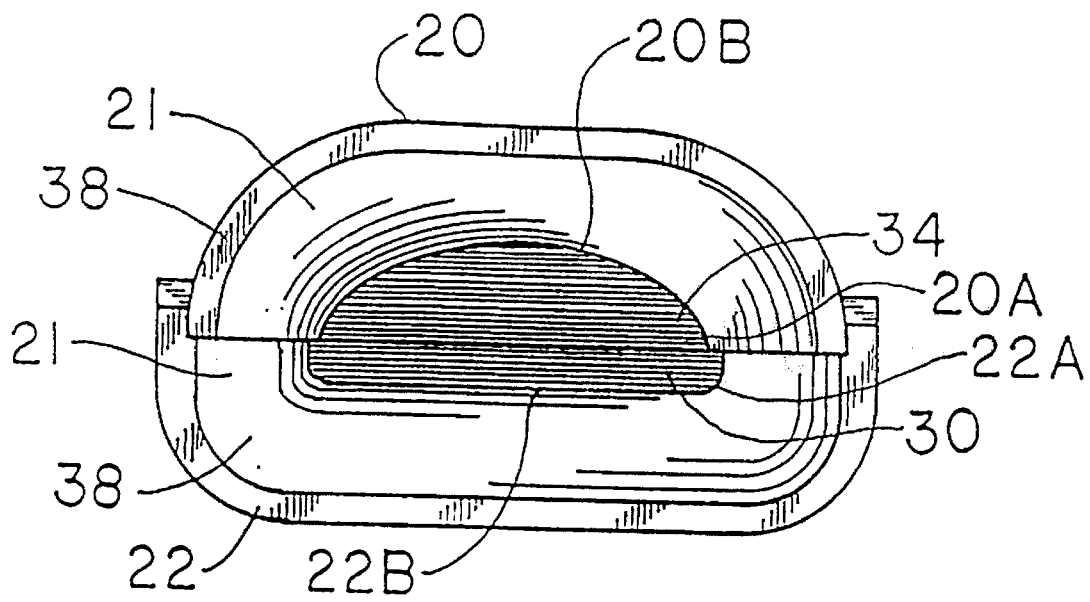
FIG. 5 is a front view of the clamp

The two side walls and the central wall form a cavity shown at 34 for inner half shell 20 and at 30 for outer half shell 22 (see FIG. 5).

The two half shells are assembled face to face with the side walls 20a of inner half shell 20 fitting within cavity 30 of the outer half shell 22 along the inside of side walls 22a of outer half shell 22. Cavities 34,30 flare from the rear end to the front end of half shells 20,22. Half shells 20, 22 have at their rear end a rear wall 20c, 22c respectively which close the rear of cavities 34, 30 and which abut each other when the two half shells are assembled. Central walls 20b and 22b are, transversally, curved and flat respectively. The full cavity formed by facing cavities 34,30 is closed at the rear end of clamp 10 and is opened at the front end to expose an oyster 40 or the like clamped between the two half-shells. The front opening is flared being defined by outwardly directed front walls 2 and 38 respectively which form a hand shield.

Figure 3A:
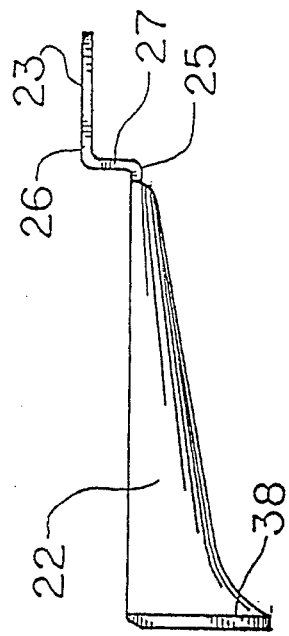
FIG. 3A is a side view of the outer shell
Figure 3B:
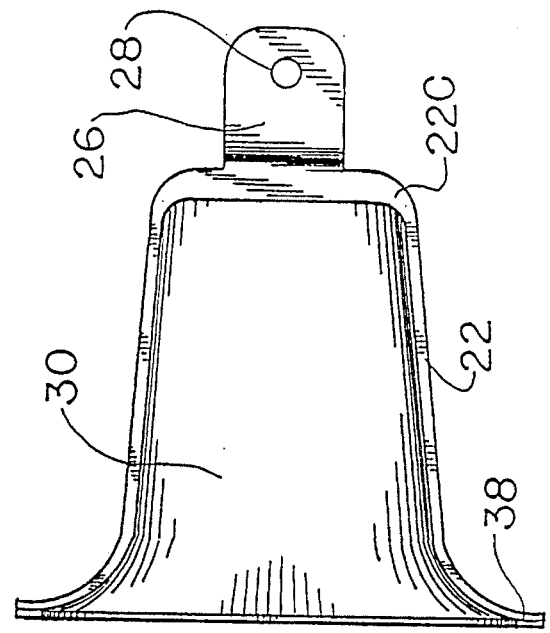
FIG. 3B is a top view of the interior of the outer shell
Figure 2A:
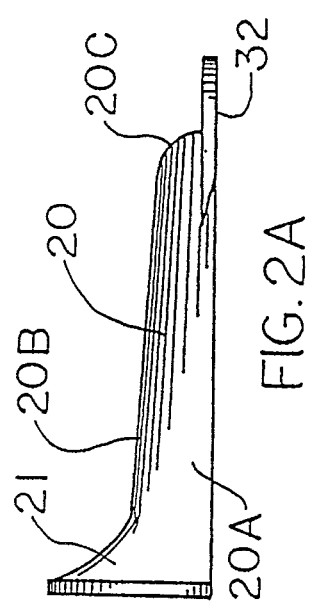
FIG. 2A is a side view of the inner shell
Figure 2B:
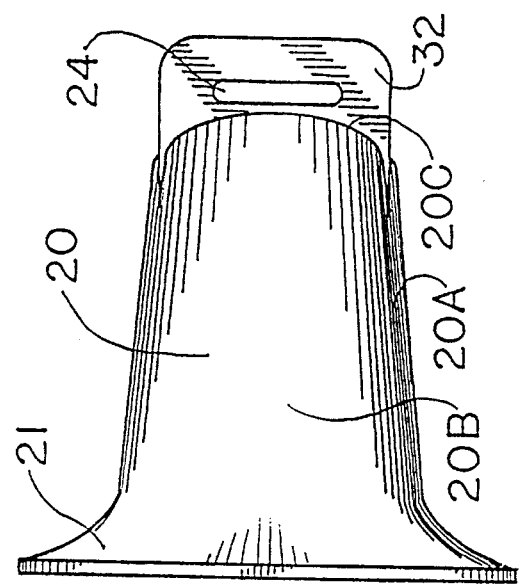
FIG. 2B is a top view of the outer shell

The two half-shells are hinged together at their rear end by a hinge means which can be disassembled: this hinge means comprises a flat extension 32 equipped with a transverse slot 24, at the rear end of inner half shell 20, and a pivot arm 26 at the rear end of outer half shell 22. Pivot arm 26 has a Z shape defined a first wing 23—FIG. 3A—, a second wring 25 and a web 27. Web 27 acts as a distancing piece for second wing 25 which protrudes from the rear wall 22c of the outer half shell 22. Wings 23, 25 are parallel with the free edges of side walls 22a and web 27 makes a 90° angle with wings 23, 25. First wing 23 has a hole 28. FIG. 3B at its end to permit hanging up to a hook. The hinge means is assembled by inserting pivot arm 26 into slot 24 of extension 32.

Figure 4:
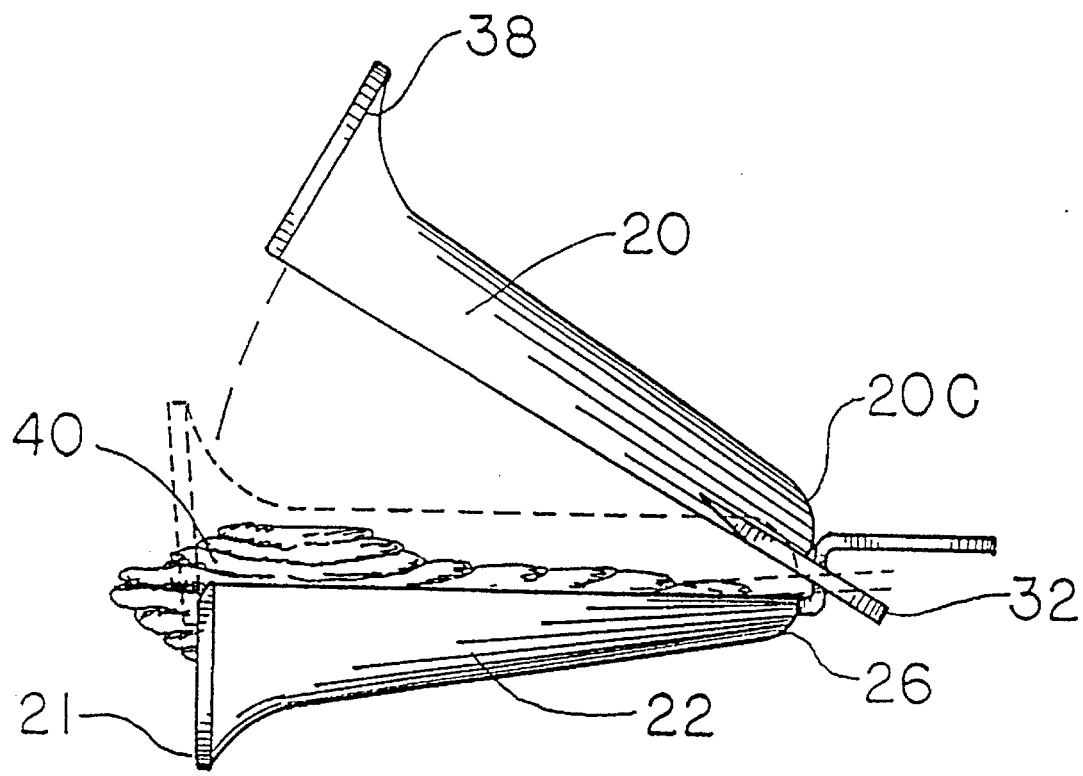
FIG. 4 is a side view of the clamp in operation.

The two-half-shells 20, 22 form pincers. An oyster 40 is then inserted in the opened oyster clamp 10. The clamp 10 is then manually pressed closed to trap the oyster 40 and the user may securely insert a knife into the oyster 40 which is exposed at the front of the clamp. The web 27 of the pivot arm 26 should be longer than the thickness of extension 32 of inner half shell 20. That leaves a bit of play necessary for the inner half shell 20 to pivot within the outer half shell 22 for the clamp to adjust itself to the size of the oyster 40. The clamp flat central wall 22b and concave central wall 30b better fit the shape of oysters. The funnel shape of the cavity 30,34 still increases the size range of the oysters which can be firmly gripped by clamp 10. The second wing 25 should also have a good length so the clamp 10 will not dismantle itself while manipulating. It is noted that the hinge 26, 32 prevents relative longitudinal shifting of half shells 20, 22. As shown in FIGS. 1, 4 and 5, front wall 38 overlaps front wall 21 to allow closing of the two half shells.

The clamp is made of a plastic material which is consistent with the standards in effect for food related products.

Other embodiments are possible and limited only by the scope of the appended claims:

I claim:

1. A clamp for holding an oyster and like mollusc while being pryed opened, comprising an inner half shell and an outer half shell, each half shell of elongated shape, with a front edge and a rear end and of U-shaped cross-section including two side walls, a central wall and a back wall which define a cavity opened at said front edge, hinge means hinging said two-half shells together at their rear ends said two half shells capable of pivoting to a closed position facing each other with the two cavities forming an enclosure with a front opening, the side walls of said inner half shell nesting within the cavity the outer half shell, whereby the size of said enclosure is variable and said enclosure is accessible at said front opening, and whereby a mollusc of variable size can be located in said enclosure and clamped by inward pressure exerted on said central walls while being exposed to a prying knife at said front opening.

2. A clamp as defined in claim 1 wherein each half shell has an outward rib along its front edge, said rib providing a hand shield.

3. A clamp as defined in claim 2 wherein the rib of said inner half-shell overlaps the rib of said outer shell in said closed position.

4. A clamp as defined in claim 2 wherein the inner surface of said central wall is generally flat in said outer half shell and concave in said inner half shell.

5. A clamp as defined in claim 4 wherein said cavities flare from said rear end to said front edge.

6. A clamp as defined in claim 1 wherein said hinge means prevent longitudinal relative shifting of said two half-shells.

7. A clamp as defined in claim 6 wherein said back walls abut each other in the closed position of said half shells.

8. A clamp as defined in claim 7 wherein said side walls and said back wall form a coplanar surface and said hinge means include an extension protruding from the rear end of said inner half shell in a direction parallel with said surface, and an L-shaped pivot arm at the rear-end of said outer half-shell comprising a web formal to said surface and protruding therefrom and an outer wing extending from said web in a direction parallel to said surface, said outer wing and web releasably insertable into a transverse slot of said extension.

9. A clamp for prying open oysters and other molluscs comprising:

two half shells facing each other when assembled and including a top half shell and a bottom half shell, each of said half shells comprising a rear and a front, said front comprising means for guarding projecting out of said half shell, said means for guarding of said top half shell and said means for guarding of said bottom half shell creating a continuous guard to protect a user's hand, said rear of said top half shell having an extension with a transverse slot, said rear of said bottom half shell having a Z-shaped pivot arm comprising a web and two wings joined to said web in opposite direction, a first wing disposed on a plane parallel to the plane of said second wing and coinciding with said rear of said bottom half shell, so that to assemble said half shells, said web goes through said transverse slot at a 90° angle and said first wing becomes parallel to said extension.

10. A clamp as defined in claim 9 wherein said half shells are almost rectangular, said extension is flat and the length of the said web is superior to the thickness of said flat extension said second wing being of a length sufficient to prevent said half shells to dismantle themselves too easily.

11. A clamp as defined in claim 10 wherein said rectangular half shells widen lightly from said rear to said front so they will provide a cone shape when assembled.

12. A clamp as defined in claim 9 wherein said bottom half shell has a cavity with a flat central surface and said top half shell has a cavity with a curved central surface.

13. An opener hand shield as defined in claim 9 wherein said second wing of the said pivot arm comprises an opening to hang said opener up.

\* \* \* \* \*